US012603202B2

(12) United States Patent
Xu et al.

(10) Patent No.: US 12,603,202 B2
(45) Date of Patent: Apr. 14, 2026

(54) METHOD FOR MANUFACTURING SINTERED MAGNET AND SINTERED MAGNET

(71) Applicants: NINGBO KONIT INDUSTRIES INC., Ningbo (CN); NINGBO HEFENG NEW MATERIAL CO., LTD, Ningbo (CN); NINGBO KONIT XINFENG PRECISION MANUFACTURING CO., LTD, Ningbo (CN); NINGBO KONIT & NIHON MAGNETIC MATERIALS INC., Ningbo (CN); BEIJING ZHONG KE SAN HUAN HI-TECH CO., LTD., Beijing (CN)

(72) Inventors: Yanlong Xu, Ningbo (CN); Saifang Xu, Ningbo (CN); Chenghong Gu, Ningbo (CN); Gang Yao, Ningbo (CN)

(73) Assignees: NINGBO KONIT INDUSTRIES INC., Ningbo (CN); NINGBO HEFENG NEW MATERIAL CO., LTD, Ningbo (CN); NINGBO KONIT XINFENG PRECISION MANUFACTURING CO., LTD, Ningbo (CN); NINGBO KONIT & NIHON MAGNETIC MATERIALS INC., Ningbo (CN); BEIJING ZHONG KE SAN HUAN HI-TECH CO., LTD., Beijing (CN)

( * ) Notice: Subject to any disclaimer, the term of this patent is extended or adjusted under 35 U.S.C. 154(b) by 587 days.

(21) Appl. No.: 18/114,647

(22) Filed: Feb. 27, 2023

(65) Prior Publication Data

US 2024/0290522 A1 Aug. 29, 2024

(30) Foreign Application Priority Data

Dec. 29, 2021 (CN) ........................ 202111640680.X

(51) Int. Cl.
*H01F 41/02* (2006.01)
*H01F 1/057* (2006.01)

(52) U.S. Cl.
CPC ......... *H01F 1/0578* (2013.01); *H01F 1/0572* (2013.01); *H01F 41/0293* (2013.01)

(58) Field of Classification Search
CPC ........ B22F 2003/242; B22F 7/02; B22F 7/04; B22F 2007/042; B22F 2007/045; B22F 2007/047; C21D 1/68; C21D 1/70; C21D 1/72; C21D 8/1277; C21D 8/1283; C21D 8/1288; C21D 8/1294; H01F 1/057; H01F 1/0571; H01F 1/0572; H01F 1/0573; H01F 1/0575; H01F 1/0576; H01F 1/0577; H01F 1/0578; H01F 41/0253; H01F 41/0293
See application file for complete search history.

(56) References Cited

U.S. PATENT DOCUMENTS

| | | | | |
|---|---|---|---|---|
| 2008/0245442 | A1* | 10/2008 | Nakamura | H01F 41/0293 148/101 |
| 2016/0300649 | A1 | 10/2016 | Sagawa et al. | |
| 2017/0263380 | A1* | 9/2017 | Mino | H01F 41/0293 |
| 2018/0061568 | A1 | 3/2018 | Yu et al. | |
| 2021/0146709 | A1* | 5/2021 | Kuribara | H01F 41/026 |
| 2021/0166870 | A1* | 6/2021 | Wang | H01F 41/0293 |

FOREIGN PATENT DOCUMENTS

| | | | | |
|---|---|---|---|---|
| CN | 105144321 | A | 12/2015 | |
| CN | 105755441 | A | 7/2016 | |
| CN | 106328367 | A | 1/2017 | |
| CN | 106328367 | B | 11/2017 | |
| CN | 105755441 | B | 1/2019 | |
| DE | 4323656 | A1 * | 1/1995 | H02K 15/03 |
| WO | WO-2015156074 | A1 * | 10/2015 | B22F 9/00 |
| WO | WO-2019004368 | A1 * | 1/2019 | H01F 1/053 |

OTHER PUBLICATIONS

James F. Shackelford and William Alexander, CRC Materials Science and Engineering Handbook, Third edition, CRC Press, 2001, pp. 58-59. (Year: 2001).*

* cited by examiner

*Primary Examiner* — Vanessa T. Luk
(74) *Attorney, Agent, or Firm* — ANOVA LAW GROUP, PLLC

(57) ABSTRACT

A magnet preparation method includes coating powder slurry on at least one of a first surface or a second surface of an NdFeB matrix and carrying out a curing reaction, to obtain a coated magnet, and subjecting the coated magnet to a vacuum heat treatment, a grain boundary diffusion treatment, and an aging treatment. The first surface and the second surface are opposite to each other. The powder slurry includes powder containing heavy rare earth element and UV monomer. The UV monomer includes radical-cured UV monomer. A temperature of the vacuum heat treatment is in a range from 250° C. to 600° C.

18 Claims, No Drawings

METHOD FOR MANUFACTURING SINTERED MAGNET AND SINTERED MAGNET

CROSS-REFERENCE TO RELATED APPLICATION

This application claims priority to Chinese Application No. 202111640680.X, filed Dec. 29, 2021, the entire content of which is incorporated herein by reference.

TECHNICAL FIELD

The present disclosure relates to a method for manufacturing rare earth sintered magnet and thereof.

BACKGROUND

Due to the excellent magnetic properties such as high remanence, high coercivity and high magnetic energy product, NdFeB sintered magnet has been widely used in many fields such as hybrid electric vehicles, wind power generation, servo motors and energy-saving household appliances.

With the development of equipment towards intelligence, miniaturization and light weight, the magnetic performance requirement of NdFeB sintered magnet has been becoming higher and higher, especially higher temperature resistance. In order to improve the coercivity and the high temperature resistance of the magnet and reduce the cost, grain boundary diffusion technology has been widely used. The grain boundary diffusion method refers to depositing a layer of heavy rare earth powder on the surface of a magnet through methods comprising sputtering, vapor depositing, electrophoretic plating, coating, etc., and then heating the magnet to make the heavy rare earth elements on the magnet surface diffuse into the magnet interior, forming a magnetic hardening shell layer on the main phase grain boundary layer to improve the coercivity. The key of the method is to obtain the heavy rare earth coating with uniform thickness and high binding force on the surface of the magnet.

Chinese patent publication CN105144321A discloses a method for manufacturing R—Fe—B series magnets and a coating for grain boundary diffusion treatment. The coating obtained by mixing heavy rare earth powder with silicone grease is applied to the magnet surface, followed by diffusion aging treatment. The coating prepared by the method is remains in paste form and cannot be cured until it is diffused in the furnace. The binding force between the coating and the magnet is low, so that the coating is easy to scrape off in the operation process. The coating cannot be completely coated on the surface of the magnet due to unreasonable tooling of the equipment. The loading capacity of the diffusion treatment is affected and the cost is increased since the coated products cannot be stacked together.

Chinese patent publication CN105755441B discloses a diffusion heavy rare earth method to increase the coercivity of sintered NdFeB magnets by a magnetron sputtering, wherein high coercivity magnets are prepared by performing oil removal cleaning, ion activation, sputtering coating and diffusion aging on a product. The coating prepared by this method has high adhesion, but the equipment investment, high energy consumption, and expensive target processing costs lead to too high final production costs, which is not conducive to mass production.

Chinese patent publication CN106328367B discloses a method for preparing R—Fe—B-based sintered magnet, which comprises preparing slurry mixed with superfine Tb powder, organic solvent and antioxidant, slurry covering the surface of NdFeB matrix, diffusing and aging the matrix in a vacuum furnace. The organic solvent in the slurry prepared by this method is easy to volatilize at room temperature and after slurry volatilization the binding force between the coating formed and the NdFeB matrix is very low. Hence, the powders in the coating are easy to fall off during operation, resulting in poor process control and product consistency.

SUMMARY

This disclosure provides a method for manufacturing sintered magnet to increase the binding force of the coating and the matrix, reduce the carbon residue in the subsequent sintering process of the coating material used for the grain boundary diffusion of the magnet after curing, and further improve the coercivity of the magnet.

In order to achieve the above object, the first aspect of the disclosure provides a powder slurry for grain boundary diffusion of the magnet, which includes the powder containing heavy rare earth element, UV monomer, polymerization inhibitor, photoinitiator, and dispersant; the UV monomer is the radical-cured UV monomer;

wherein, based on the total mass of the powder slurry, the addition amount of the powder accounts for a range from 60 wt % to 80 wt % of the mass of the powder slurry, the addition amount of the UV monomer accounts for a range from 15 wt % to 35 wt % of the mass of the powder slurry, the addition amount of the polymerization inhibitor accounts for a range from 0.01 wt % to 0.1 wt % of the mass of the powder slurry, the addition amount of the photoinitiator accounts for a range from 0.5 wt % to 5 wt % of the mass of the powder slurry, and the addition amount of the dispersant accounts for a range from 0.02 wt % to 0.2 wt % of the mass of the powder slurry.

Optionally, the viscosity value of the powder slurry is in a range from 100 mPa·s to 5000 mPa·s.

Optionally, there is no aromatic ring in the molecular chain of the UV monomer; in some embodiments, the UV monomer contains acrylate structure; in some embodiments, the UV monomer contains methacrylate structure; optionally, the UV monomer is at least one selected from the group consisting of pentaerythritol triacrylate, isobornyl methacrylate, ethoxylated pentaerythritol tetraacrylate, trimethylolpropane trimethacrylate, dicyclopentanyl methacrylate, dipentaerythritol hexaacrylate, 3,3,5-trimethylcyclohexyl acrylate, lauryl methacrylate, and poly(ethyleneglycol) dimethacrylate.

Optionally, the particle size of the powder containing the heavy rare earth element is in a range from 1 μm to 10 μm; optionally, the heavy rare earth element in the powder is at least one of Dy, Tb, and Ho; in some embodiments, the powder containing the heavy rare earth element is at least one selected from the group consisting of rare earth fluoride powder, rare earth oxyfluoride powder, rare earth hydride powder, rare earth oxide powder; in some embodiments, the powder containing the heavy rare earth element is at least one selected from the group consisting of $Dy_2O_3$, $Dy_{1-y}M_yH_x$, $Tb_2O_3$ and $Tb_{1-y}M_yH_x$, wherein M is at least one of Fe, Cu, Zn and Al, and the value of x is 2 or 3, and the value of y is in a range from 0 to 0.3.

Optionally, the polymerization inhibitor is at least one selected from the group consisting of tert-butyl catechol, tert-butyl hydroquinone, hydroquinone and aluminum N-nitrosophenylhydroxylamine.

Optionally, the photoinitiator is at least one selected from the group consisting of benzoin dimethyl ether, 2,4,6-trimethylbenzoyl-diphenyl phosphine oxide, 2-hydroxy-2-methyl-phenylacetone, 2-isopropylthioxanthone, and 1-hydroxycyclohexyl phenyl ketone.

Optionally, the dispersant is selected from at least one of glycerol monooleate, polyethylene glycol oleate and oleoyl monolaurate.

The second aspect of the present disclosure provides a method for manufacturing magnet comprising:

- coating powder slurry on first surface of NdFeB matrix,
- carrying out first curing reaction to obtain magnet coated with first coating,
- subjecting the magnet coated with the first coating to vacuum heat treatment, grain boundary diffusion treatment and aging treatment in turn;
- or alternatively;
- coating the powder slurry on first surface of NdFeB matrix,
- carrying out first curing reaction to obtain magnet coated with first coating,
- coating the powder slurry on the second surface of the NdFeB matrix coated with the first coating,
- carrying out second curing reaction to obtain the magnet coated with two coatings,
- subjecting the magnet coated with two coatings to vacuum heat treatment, grain boundary diffusion treatment and aging treatment in turn;
- wherein:
- the first surface and the second surface are selected from the upper surface and the lower surface of the NdFeB matrix;
- the powder slurry is used for the grain boundary diffusion of the magnet.

Optionally, the weight increasing proportion of the NdFeB matrix with coatings on double surfaces is in a range from 0.1% to 2%.

Optionally, the processing of the first curing reaction and the second curing reaction includes irradiating the surface of the NdFeB matrix coated with the powder slurry in an inert atmosphere by using an ultraviolet lamp, wherein the inert atmosphere is nitrogen or argon, and the irradiation time is in a range from 1 s to 100 s; the treatment temperature of the vacuum heat treatment is in a range from 250° C. to 600° C., and the treatment time of the vacuum heat treatment is in a range from 1 hour to 10 hours; the treatment temperature of the grain boundary diffusion treatment is in a range from 800° C. to 1000° C., and the treatment time of the grain boundary diffusion treatment is in a range from 2 hours to 50 hours; the treatment temperature of the aging treatment is in a range from 450° C. to 600° C., and the treatment time of the aging treatment is in a range from 1 hour to 8 hours.

A third aspect of the present disclosure provides a magnet prepared by the above method.

The advantages of the present disclosure will be set forth.

The powder slurry for the magnet grain boundary diffusion is not volatilized at room temperature, so that when the powder slurry is used for coating, the stability and controllability of the coating process can be ensured, and the obtained coating has better uniformity.

Since the powder slurry for the magnet grain boundary diffusion is prepared by adopting a UV adhesive system, the curing time of the powder slurry is short and the heating of the powder slurry is not needed compared with conventional method. The production efficiency can be greatly improved. The manufacturing cost is reduced. And the powder slurry is particularly suitable for mass production. In addition, the binding force between the coating and the matrix is high after curing, and the coating can be prevented from falling off in the transferring process and stacking processes of the magnet.

Since the UV adhesive system can be cracked under a vacuum condition, the heavy rare earth diffusion from the surface of the NdFeB matrix to the interior of the NdFeB matrix is not influenced, and the coercivity of the magnet can be greatly improved under the condition that the remanence of the magnet is not remarkably reduced.

The magnet manufacturing method has the advantages of high utilization rate of the heavy rare earth powders, convenience in recovery, simple process and low cost. It is suitable for mass production.

DETAILED DESCRIPTION OF EMBODIMENTS

Specific embodiments of the present disclosure are described in detail below. It should be understood that the detailed description and specific embodiments, while indicating the present disclosure, are given by way of illustration and explanation only, not limitation.

The first aspect of the disclosure provides a powder slurry for grain boundary diffusion of the magnet, which includes the powders containing the heavy rare earth element, a UV monomer, a polymerization inhibitor, a photoinitiator, and a dispersant; the UV monomer is the radical curing UV monomer;

wherein, based on the total mass of the powder slurry, the addition amount of the powders accounts for in a range from 60 wt % to 80 wt % of the mass of the powder slurry, the addition amount of the UV monomer accounts for in a range from 15 wt % to 35 wt % of the mass of the powder slurry, the addition amount of the polymerization inhibitor accounts for in a range from 0.01 wt % to 0.1 wt % of the mass of the powder slurry, the addition amount of the photoinitiator accounts for in a range from 0.5 wt % to 5 wt % of the mass of the powder slurry, and the addition amount of the dispersant accounts for in a range from 0.02 wt % to 0.2 wt % of the mass of the powder slurry.

The inventor discovered that the UV monomer, the polymerization inhibitor, the photoinitiator, and the dispersant of the powder slurry prepared by the above-mentioned method can be completely removed after polymerization process and curing process and there is no carbon residue left in the magnet, so that the diffusion of the heavy rare earth powder to the magnet matrix can be greatly promoted. Moreover, it can the avoid the phenomenon of less improvement of magnet performance and coercivity after grain boundary diffusion caused by the obstruction of the diffusion of heavy rare earth powder due to carbon residue. Further, the powder slurry of the present disclosure can maintain high adhesion between the powders containing the heavy rare earth element and the NdFeB matrix after the proceeding of the UV monomer, the polymerization inhibitor, the photoinitiator, and the dispersant removed by polymerizing and curing. Specifically, when the curing temperature is in a range from 250° C. to 600° C., the UV monomer, the polymerization inhibitor, the photoinitiator and the dispersant of the powder slurry can be complete removed and the powders containing the heavy rare earth are adhered to the surface of the NdFeB matrix and not easy to fall off. The heavy rare earth utilization efficiency is promoted.

This disclosure introduces for the first time the UV curing mode into the field of grain boundary diffusion of the magnet. The inventor discovered that the coating thickness can be optimized and the coercivity of the magnet after diffusion is obviously improved when the viscosity value of the powder slurry covered on the surface of the matrix is in a range from 100 mPa·s to 5000 mPa·s.

In this disclosure, the free radical type UV monomer is more compatible with other components in the powder slurry, such as powders containing heavy rare earth elements, so that the system can play a better role, so that the organic system performance in storage is more stable. In some embodiments, there is no aromatic ring in the molecular chain of the UV monomer; In some embodiments, the UV monomer contains an acrylate structure. The inventor discovered that the high molecular polymer formed by the UV monomer containing the acrylate structure in the curing reaction is easily decomposed into small molecules at high temperature, which avoids carbonization of the high molecular polymer causing high carbon content and blocking the diffusion channel, and will promote the grain boundary diffusion performance; in some embodiments, the UV monomer contains methacrylate structure.

The UV monomer is at least one selected from the group consisting of pentaerythritol triacrylate, trimethylolpropane trimethacrylate, dicyclopentanyl methacrylate, dipentaerythritol hexaacrylate, 3,3,5-trimethylcyclohexyl acrylate, lauryl methacrylate, and poly(ethyleneglycol) dimethacrylate; in some embodiments, the UV monomer is at least one selected from the group consisting of trimethylolpropane trimethacrylate, lauryl methacrylate, and poly(ethyleneglycol) dimethacrylate The particle size of the powder containing the heavy rare earth element is in some embodiments in a range from 1 μm to 10 μm; optionally, the heavy rare earth element in the powder can be selected from at least one of Dy, Tb, and Ho; in some embodiments, the powder containing the heavy rare earth element is at least one selected from the group consisting of rare earth fluoride powder, rare earth oxyfluoride powder, rare earth hydride powder, rare earth oxide powder; in some embodiments, the powder containing the heavy rare earth element is at least one selected from the group consisting of $Dy_2O_3$, $Dy_{1-y}M_yH_x$, $Tb_2O_3$ and $Tb_{1-y}M_yH_x$, wherein M is at least one of Fe, Cu, Zn and Al, and the value of x is 2 or 3, and the value of y is in a range from 0 to 0.3.

The polymerization inhibitor is at least one selected from the group consisting of tert-butyl catechol, tert-butyl hydroquinone, hydroquinone and aluminum N-nitrosophenylhydroxylamine.

The photoinitiator is at least one selected from the group consisting of benzoin dimethyl ether, 2,4,6-trimethylbenzoyl-diphenyl phosphine oxide, 2-hydroxy-2-methyl-phenylacetone, 2-isopropylthioxanthone, and 1-hydroxycyclohexyl phenyl ketone.

The dispersant is at least one selected from the group consisting of glycerol monooleate, polyethylene glycol oleate and oleoyl monolaurate The mixing method of the powders containing the heavy rare earth element, the UV monomer, the polymerization inhibitor, the photoinitiator, and the dispersant in the present disclosure can be well known to those skilled in the art, and for example, three-roll mixing or ball-milling mixing can be selected.

A second aspect of the present disclosure provides a magnet manufacturing method comprising:

coating the powder slurry on the first surface of the NdFeB matrix, and then carrying out the first curing reaction to obtain the NdFeB magnet coated with the first coating, the magnet is successively subjected to vacuum heating, grain boundary diffusing and aging;

or alternatively, coating the powder slurry on the first surface of the NdFeB matrix, and then carrying out the first curing reaction to obtain the NdFeB magnet coated with the first coating; coating the powder slurry on the second surface of the NdFeB matrix coated with the first coating, and then carrying out the second curing reaction to obtain the NdFeB magnet coated with two surfaces; the magnet is successively subjected to vacuum heating, grain boundary diffusing and aging;

wherein, the first surface and the second surface are selected from the upper surface and the lower surface of the NdFeB matrix; the powder slurry is used for the grain boundary diffusion of the magnet.

In the present disclosure, where the contrary description is not made, the use of the directional words such as "upper and lower" means upper and lower in the state where the NdFeB matrix is normally placed; for example, references to "upper surface" and "lower surface" in this disclosure refer to the upper and lower surfaces of the NdFeB matrix when in a normally-placed state. The terms "first," "second," and the like in this disclosure are used to distinguish one element from another, and are not necessarily order or importance.

The preparation of the NdFeB matrix includes smelting the raw material, milling, molding, sintering and other processing. The raw materials are well known to those skilled in the art.

The coating method of the powder slurry in the present disclosure can be well known to those skilled in the art, which it includes but is not limited to spray coating, slurry dip coating, screen printing, roll coating, spin coating, and the like.

As an embodiment of the present disclosure, the weight increasing proportion of the NdFeB matrix with coatings on double surfaces is in a range from 0.1% to 2%.

The processing of the first curing reaction and the second curing reaction includes irradiating the surface of the NdFeB matrix coated with the powder slurry in an inert atmosphere by using an ultraviolet lamp, wherein the inert atmosphere is nitrogen or argon, and the irradiation time is in a range from 1 s to 100 s; the treatment temperature of the vacuum heating treatment is in a range from 250° C. to 600° C., and the treatment time is in a range from 1 hour to 10 hours; the treatment temperature of the grain boundary diffusing treatment is in a range from 800° C. to 1000° C., and the treatment time is in a range from 2 hours to 50 hours; the treatment temperature of the aging treatment is in a range from 450° C. to 600° C., and the treatment time of the aging treatment is in a range from 1 hour to 8 hours.

A third aspect of the present disclosure provides a magnet prepared by the above method with high coercivity.

The present disclosure is further illustrated by the following embodiments, but is not to be construed as being limited thereby. The raw materials used in the embodiments are all available from commercial sources.

Embodiment 1

The $TbH_3$ powder was ground by jet mill to average particle size of 2.5 μm to obtain the powder containing heavy rare earth elements of this embodiment. Then, the powder containing heavy rare earth elements, UV monomer, polymerization inhibitor, photoinitiator and dispersant were prepared according to the proportions shown in Table 1, and the powder slurry of this embodiment was obtained by mixing them fully and evenly with a three-roll mill. The viscosity value of the powder slurry is 700 MPa·s. The powder slurry was screen printed by screen printing equipment onto the upper surface of NdFeB matrix (30 mm*30 mm*3 mm) after surface cleaning, and then the NdFeB matrix covered with power slurry was irradiated by UV lamp for 20 s to make it cured completely in an argon atmosphere. After that, the NdFeB matrix was turned over and the same process was repeated on its lower surface to obtain a double-sided coated magnet, wherein the weight increasing proportion of the magnet is 0.65% compared with the NdFeB matrix without coating. Then double-sided coated magnet was put into a vacuum furnace for heat treatment at a temperature of 400° C. for 3 hours, diffusion treatment at a temperature of 900° C. for 8 hours and aging treatment at a temperature of 500° C. for 4 hours to obtain a diffused magnet (i.e., a magnet that has undergone grain boundary diffusion, also referred to in this disclosure as "treated magnet"). The diffused magnet was tested and the results were shown in table 2. Compared with the remanence of the magnet before diffusion, the remanence reduction of the diffused magnet only decreased by about 100 Gs, but the coercivity increased by about 10 KOe, as can be seen from Table 2.

TABLE 1

| Categories | Name(s) | Content/(wt %) |
|---|---|---|
| Heavy rare earth powder | $TbH_3$ | 70 |
| UV monomer | Lauryl methacrylate | 9 |
| | Pentaerythritol triacrylate | 20 |
| Polymerization inhibitor | Tert-butylhydroquinone | 0.03 |
| Photoinitiator | 2,4,6-trimethylbenzoyl-diphenyl phosphine oxide | 0.2 |
| | 1-hydroxycyclohexyl phenyl ketone | 0.7 |
| Dispersant | Polyethylene glycol oleate | 0.07 |

TABLE 2

| | Sample number | Br/kGs | $H_{cJ}$/kOe | $H_k/H_{cJ}$ |
|---|---|---|---|---|
| Before diffusion | A0 | 14.45 | 12.1 | 98% |
| After diffusion | A1 | 14.38 | 22.3 | 96.5% |
| | A2 | 14.36 | 22.4 | 96% |
| | A3 | 14.38 | 22.1 | 97% |
| | A4 | 14.35 | 22.3 | 95.5% |
| | A5 | 14.37 | 22.2 | 96% |

Embodiment 2

$(Dy_{0.8}Fe_{0.2})H_3$ powder was ground by jet mill to average particle size of 5 μm to obtain the heavy rare earth powder of this embodiment. The heavy rare earth powder, UV monomer, polymerization inhibitor, photoinitiator and dispersant were prepared in accordance with the proportions shown in Table 3 below, and the powder slurry of this embodiment was obtained by mixing them fully and evenly with a ball mill. The viscosity value of the powder slurry was 1100 mPa·s.

The powder slurry was screen printed by screen printing equipment onto the upper surface of NdFeB matrix (30 mm*30 mm*3 mm) after surface cleaning, and then the NdFeB matrix covered with power slurry was irradiated by UV lamp for 50 s to make it cured completely in a nitrogen atmosphere. After that, the NdFeB matrix was turned over, and the same process was repeated on the lower surface of the NdFeB matrix to obtain a double-sided coated magnet, wherein the weight increasing proportion of the magnet is 0.75% compared with the NdFeB matrix without coating. Then a diffused magnet was obtained after the double-sided coated magnet was put into a vacuum furnace for heat treatment at a temperature of 450° C. for 2 hours, diffusion treatment at a temperature of 920° C. for 15 hours and aging treatment at a temperature of 520° C. for 4 hours. The diffused magnet was tested and the results were shown in table 2. Compared with the remanence of the magnet before diffusion, the remanence reduction of the diffused magnet only decreased by about 90 Gs, but the coercivity increased by about 6 kOe, as can be seen from table 4.

TABLE 3

| Categories | Name(s) | Content/(wt %) |
|---|---|---|
| Heavy rare earth powder | $(Dy_{0.8}Fe_{0.2})H_3$ | 75 |
| UV monomer | Poly(ethyleneglycol) dimethacrylate | 3 |
| | Pentaerythritol triacrylate | 20 |
| Polymerization inhibitor | Tert-butylcatechol | 0.05 |
| Photoinitiator | 2-isopropylthioxanthone | 1.8 |
| Dispersant | Glycerol monooleate | 0.15 |

TABLE 4

| | Sample number | Br/kGs | $H_{cJ}$/kOe | $H_k/H_{cJ}$ |
|---|---|---|---|---|
| Before diffusion | A0 | 14.28 | 14.3 | 98% |
| After diffusion | A1 | 14.19 | 20.4 | 96.8% |
| | A2 | 14.20 | 20.7 | 97.2% |
| | A3 | 14.21 | 20.5 | 97.4% |
| | A4 | 14.19 | 20.4 | 96.5% |
| | A5 | 14.20 | 20.6 | 96.7% |

Embodiment 3

The mixture of Dy2O3 powder and Tb2O3 powder was ground by high-energy ball mill to average particle size of 1.2 μm to obtain the heavy rare earth powder of this embodiment. The heavy rare earth powder, UV monomer, polymerization inhibitor, photoinitiator and dispersant were prepared in accordance with the proportions shown in Table 5 below, and the powder slurry of this embodiment was obtained by mixing them fully and evenly with a three-roll machine. The viscosity value of the powder slurry was 1000 mPa·s.

The powder slurry was screen printed by screen printing equipment onto the upper surface of NdFeB matrix (30 mm*30 mm*3 mm) after surface cleaning, and then the NdFeB matrix covered with power slurry was irradiated by UV lamp for 50 s to make it cured completely in a nitrogen atmosphere. After that, the NdFeB matrix which was turned over and the same process was repeated on the lower surface of to obtain a double-sided coated magnet, wherein the weight increasing proportion of the magnet is 0.9% compared with the NdFeB matrix without coating. Then a diffused magnet was obtained after the double-sided coated magnet was put into a vacuum furnace for heat treatment at a temperature of 350° C. for 8 hours, diffusion treatment at a temperature of 860° C. for 18 hours and aging treatment at a temperature of 485° C. for 7 hours. The diffused magnet was tested and the results were shown in table 2. Compared with the remanence of the magnet before diffusion, the remanence reduction of the diffused magnet only decreased by about 180 Gs, but the coercivity increased by about 7 kOe, as can be seen from table 6.

TABLE 5

| Categories | Name(s) | Content/(wt %) |
|---|---|---|
| Heavy rare earth powder | $Dy_2O_3$ | 45 |
| | $Tb_2O_3$ | 20 |
| Polymerization inhibitor | Lauryl methacrylate | 15 |
| | 3,3,5-trimethylcyclohexyl acrylate | 5 |
| | Dipentaerythritol hexaacrylate | 14 |
| Polymerization inhibitor | Aluminum N-nitrosophenylhydroxylamine | 0.02 |
| Photoinitiator | 2,4,6-trimethylbenzoyl-diphenyl phosphine oxide | 0.5 |
| | Benzoin dimethyl ether | 0.43 |
| Dispersant | Oleoyl monolaurate | 0.05 |

TABLE 6

| | Sample number | Br/kGs | $H_{cJ}$/kOe | $H_k/H_{cJ}$ |
|---|---|---|---|---|
| Before diffusion | A0 | 13.68 | 17.2 | 97.5% |
| After diffusion | A1 | 13.53 | 24.7 | 95.6% |
| | A2 | 13.55 | 24.4 | 96.1% |
| | A3 | 13.50 | 24.3 | 96.3% |
| | A4 | 13.52 | 24.5 | 95.7% |
| | A5 | 13.53 | 24.6 | 95.5% |

Embodiment 4

The method for manufacturing the magnet of this embodiment was the same as embodiment 1, except that the powder slurry viscosity value was 80 mPa·s. The specific ratio of the powder slurry of this embodiment was shown in table 7, and the test results of the magnet were shown in Table 8. As can be seen from comparison between embodiment 4 and embodiment 1, as the viscosity value of the powder slurry was reduced to 80 mPa·s, the coercivity differences of the magnets was obvious. The coercivity of some magnet increased by only about 2 kOe, the coercivity of some magnet increased by about 10 kOe. It can be seen that the viscosity of the powder slurry is too low to ensure a stable and controllable coating process, and the obtained coating has poor uniformity, so that the improvement of magnetic property is not stable.

TABLE 7

| Categories | Name(s) | Content/(wt %) |
|---|---|---|
| Heavy rare earth powder | $TbH_3$ | 64% |
| UV monomer | Lauryl methacrylate | 35% |
| Polymerization inhibitor | Tert-butylcatechol | 0.03% |
| Photoinitiator | 2,4,6-trimethylbenzoyl-diphenyl phosphine oxide | 0.2% |
| | 1-hydroxycyclohexyl phenyl ketone | 0.7% |
| Dispersant | Polyethylene glycol oleate | 0.07% |

TABLE 8

| | Sample number | Br/kGs | $H_{cJ}$/kOe | $H_k/H_{cJ}$ |
|---|---|---|---|---|
| Before diffusion | A0 | 14.45 | 12.1 | 98 |
| After diffusion | A1 | 14.38 | 16.5 | 96.5 |
| | A2 | 14.36 | 22.1 | 96 |
| | A3 | 14.38 | 14.3 | 97 |
| | A4 | 14.35 | 22.8 | 95 |
| | A5 | 14.37 | 14.7 | 96.5 |

Comparative Embodiment 1

The method for manufacturing the magnet of this embodiment was the same as embodiment 1, except the comparative embodiment uses cationic-cured UV monomer instead of free radical-cured UV monomer, specifically a mixture of epoxytriglycerides and ketene diethanol is used to replace a mixture of methacrylate laurate and pentaerythritol triacrylate. The specific ratio of powder slurry is shown in Table 9, and the test results of the diffused magnet are shown in Table 10. Compared with the remanence of the magnet before diffusion, the remanence reduction of the diffused magnet decreased by about 100 Gs, but the coercivity only increased by about 2 kOe, as can be seen from Table 10.

By comparing comparative embodiment 1 and embodiment 1, it can be seen that the difference of UV monomer has a greater impact on the improvement of the magnet diffusion performance, and the free radical cured UV monomer in the present disclosure can be completely removed, thereby improving the diffusion channel of the powder containing heavy rare earth elements, so that the coercivity of the magnet is significantly improved. Other UV monomers, such as cation-cured UV monomers, will affect the diffusion efficiency of the magnet and have no good effect on the coercivity improvement of the magnet.

TABLE 9

| Categories | Name(s) | Content/(wt %) |
|---|---|---|
| Heavy rare earth powder | $TbH_3$ | 70 |
| UV monomer | Epoxidized triglyceride | 9 |
| | Ketene acetal | 20 |
| Polymerization inhibitor | Tert-butylhydroquinone | 0.03 |
| Photoinitiator | 2,4,6-trimethylbenzoyl-diphenyl phosphine oxide | 0.2 |
| | 1-hydroxycyclohexyl phenyl ketone | 0.7 |
| Dispersant | Polyethylene glycol oleate | 0.07 |

TABLE 10

| | Sample number | Br/kGs | $H_{cJ}$/kOe | $H_k/H_{cJ}$ |
|---|---|---|---|---|
| Before diffusion | A0 | 14.45 | 12.1 | 98% |
| After diffusion | A1 | 14.37 | 14.1 | 97% |
| | A2 | 14.37 | 14.7 | 96% |
| | A3 | 14.38 | 14.3 | 97% |
| | A4 | 14.35 | 14.3 | 96.5% |
| | A5 | 13.33 | 14.1 | 95.5% |

Some embodiments of the present disclosure have been described above in detail, however, the present disclosure is not limited to the specific details of the above embodiments, and various simple modifications may be made to the technical solution of the present disclosure within the technical idea of the present disclosure, and these simple modifications all belong to the protection scope of the present disclosure.

It should be noted that, in the above embodiments, the various features described in the above embodiments may be combined in any suitable manner, and in order to avoid unnecessary repetition, various possible combinations will not be further described in the present disclosure.

In addition, any combination of various embodiments of the present disclosure may be made, and the same should be considered as the disclosure of the present disclosure as long as it does not depart from the gist of the present disclosure.

The invention claimed is:

1. A magnet preparation method comprising:

coating powder slurry on at least one of a first surface or a second surface of an NdFeB matrix and carrying out a curing reaction, to obtain a coated magnet;

subjecting the coated magnet to vacuum heat treatment, a grain boundary diffusion treatment, and an aging treatment;

wherein:

the first surface and the second surface are opposite to each other;

the powder slurry includes powder containing heavy rare earth element, UV monomer including radical-cured UV monomer, polymerization inhibitor, photoinitiator, and dispersant, wherein based on a total mass of the powder slurry:

an amount of the powder containing the heavy rare earth element is in a range from 60 wt % to 80 wt % of the total mass of the powder slurry, an amount of the UV monomer is in a range from 15 wt % to 35 wt % of the total mass of the powder slurry, an amount of the polymerization inhibitor is in a range from 0.01 wt % to 0.1 wt % of the total mass of the powder slurry, an amount of the photoinitiator is in a range from 0.5 wt % to 5 wt % of the total mass of the powder slurry, and an amount of the dispersant is a range from 0.02 wt % to 0.2 wt % of the total mass of the powder slurry; and a temperature of the vacuum heat treatment is in a range from 250° C. to 600° C.

2. The method according to claim 1, wherein a viscosity value of the powder slurry is in a range from 100 mPa·s to 5000 mPa·s.

3. The method according to claim 1, wherein the UV monomer contains acrylate structure.

4. The method according to claim 1, wherein the UV monomer contains methacrylate structure.

5. The method according to claim 4, wherein the UV monomer includes at least one of pentaerythritol triacrylate, isobornyl methacrylate, ethoxylated pentaerythritol tetraacrylate, trimethylolpropane trimethacrylate, dicyclopentanyl methacrylate, dipentaerythritol hexaacrylate, 3,3,5-trimethylcyclohexyl acrylate, lauryl methacrylate, or poly(ethyleneglycol) dimethacrylate.

6. The method according to claim 1, wherein a powder particle size of the powder containing the heavy rare earth element is in a range from 1 to 10 μm.

7. The method according to claim 1, wherein the powder containing the heavy rare earth element includes at least one of rare earth fluoride powder, rare earth oxyfluoride powder, rare earth hydride powder, or rare earth oxide powder.

8. The method according to claim 1, wherein the heavy rare earth element in the powder includes at least one of Dy, Tb, or Ho.

9. The method for preparing magnet according to claim 1, wherein:

the powder containing the heavy rare earth element includes at least one of $Dy_2O_3$, $Dy_{1-y}M_yH_x$, $Tb_2O_3$, or $Tb_{1-y}M_yH_x$; and M is at least one of Fe, Cu, Zn, or Al, a value of x is 2 or 3, and a value of y is in a range from 0 to 0.3.

10. The method according to claim 1, wherein the polymerization inhibitor includes at least one of tert-butyl catechol, tert-butyl hydroquinone, hydroquinone, or aluminum N-nitrosophenyl hydroxylamine.

11. The method according to claim 1, wherein the photoinitiator includes at least one of benzoin dimethyl ether, 2,4,6-trimethylbenzoyl-diphenyl phosphine oxide, 2-hydroxy-2-methyl-phenylacetone, 2-isopropylthioxanthone, or 1-hydroxycyclohexyl phenyl ketone.

12. The method according to claim 1, wherein the dispersant includes at least one of glycerol monooleate, polyethylene glycol oleate, or oleoyl monolaurate.

13. The method according to claim 1, wherein:

coating the powder slurry on the at least one of the first surface or the second surface of the NdFeB matrix includes coating the powder slurry on the first surface and the second surface of the NdFeB matrix; and a weight of the NdFeB matrix coated with the powder slurry is greater than a weight of the NdFeB matrix before being coated with the powder slurry by a percentage in a range from 0.1% to 2%.

14. The method according to claim 1, wherein the curing reaction includes irradiating the at least one of the first surface or the second surface of the NdFeB matrix coated with the powder slurry using an ultraviolet lamp in an inert atmosphere.

15. The method according to claim 14, wherein:

the inert atmosphere includes nitrogen or argon; and an irradiation time is in a range from 1 s to 100 s.

16. The method according to claim 1, wherein a treatment time of the vacuum heat treatment is in a range from 1 hour to 10 hours.

17. The method according to claim 1, wherein a treatment temperature of the grain boundary diffusion treatment is in a range from 800° C. to 1000° C., and a treatment time of the grain boundary diffusion treatment is in a range from 2 hours to 50 hours.

18. The method according to claim 1, wherein a treatment temperature of the aging treatment is in a range from 450° C. to 600° C., and a treatment time of the aging treatment is in a range from 1 hour to 8 hours.

* * * * *